United States Patent [19]

Radwam et al.

[11] Patent Number: 5,600,512
[45] Date of Patent: Feb. 4, 1997

[54] DISC SPACER WITH INTERIOR GROOVE

[75] Inventors: Hatem R. Radwam, San Jose; Clifford T. Jue, Santa Cruz; Brian H. Nelson, Fremont; Bradley D. Kelemen, Santa Cruz, all of Calif.

[73] Assignee: Seagate Technology, Inc., Scotts Valley, Calif.

[21] Appl. No.: 477,295

[22] Filed: Jun. 7, 1995

Related U.S. Application Data

[63] Continuation of Ser. No. 240,037, May 9, 1994.
[51] Int. Cl.$^6$ ....................................... G11B 17/08
[52] U.S. Cl. ............................. 360/98.08; 360/99.05
[58] Field of Search ......................... 360/98.08, 99.05, 360/99.06, 99.12; 369/290, 270

[56] References Cited

U.S. PATENT DOCUMENTS

| | | | |
|---|---|---|---|
| 3,587,073 | 6/1971 | Ghose et al. | 360/135 |
| 4,408,320 | 10/1983 | Buzgo | 369/290 |
| 4,807,304 | 8/1986 | DeMoss et al. | 360/98.03 |
| 4,819,105 | 4/1989 | Edwards | 360/98.08 |
| 4,945,432 | 7/1990 | Matsuidara et al. | 360/98.02 |
| 5,006,942 | 4/1991 | Brooks et al. | 360/98.08 |

Primary Examiner—Robert S. Tupper
Assistant Examiner—George J. Letscher
Attorney, Agent, or Firm—Westman, Champlin & Kelly, P.A.

[57] ABSTRACT

A spacer supports a disc on a hub in a disc drive. The hub is rotatable about an axis of rotation. The spacer includes a member having an inner radial surface defining a hub receiving aperture for receiving an exterior surface of the hub. The inner radial surface has a generally annular groove extending from the inner radial surface generally radially outwardly from the hub.

12 Claims, 3 Drawing Sheets

DISC SPACER WITH INTERIOR GROOVE

This is a continuation of application Ser. No. 08/240,037, filed May 9, 1994.

BACKGROUND OF THE INVENTION

The present invention relates to a hub assembly in a disc drive. More particularly, the present invention relates to a disc spacer for supporting a disc on a hub assembly in a disc drive.

A typical disc drive includes one or more magnetic discs mounted for rotation on a hub or spindle. Where more than one magnetic disc is used, the discs are spaced apart from one another axially along the hub by spacers mounted between the discs. Conventional hubs typically include a flange portion which extends from one of the axial ends of the hub. The discs and spacers are placed concentrically about the hub and supported by the flange portion of the hub. The plurality of magnetic discs and the spacers are clamped down onto the flange portion of the hub using a clamp which is placed on the axial end of the hub, opposite the flange. Thus, the discs and spacers are all clamped to the hub for rotation with the hub about an axis of rotation generally defined by the radial center of the hub.

A typical magnetic disc drive also includes a transducer supported by a hydrodynamic air bearing which flies above each magnetic disc. The transducer and the hydrodynamic air bearing are collectively referred to as a data head. A drive controller is conventionally used for controlling the disc drive system based on commands received from the host system. The drive controller controls the disc drive to retrieve information form the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on the magnetic disc, and consequently represented in the read signal provided by the data head.

As industry pressure requires disc drives to be reduced in size, the axial height of the stack assembly, and consequently the axial height of the entire disc file, becomes critical. In past systems, the clamp used to hold the discs about the hub was located above and screwed onto the hub with screws running in the axial direction. However, since the axial height of the stack assembly has become critical, the clamp and the screws used to fasten the clamp to the hub take up an undesirable amount of axial space.

Therefore, a heat shrink clamp was developed. Such a clamp is described in greater detail in U.S. Pat. No. 4,639,802. Such clamps typically include a clamp ring which has an inner diameter that is slightly smaller than the outer diameter of one axial end of the hub. The clamp ring is responsive to thermal energy and expands when thermal energy is applied to it and contracts when thermal energy is removed from it. Therefore, to assemble the clamp ring onto the hub, the clamp ring is first heated, thereby expanding it such that the inner diameter of the clamp ring is slightly larger than the outer diameter of the hub. The clamp ring is then placed about the hub and allowed to cool to establish a frictional or interference fit with the outer surface of the hub.

Just prior to placing the clamp on the hub, the plurality of discs and spacers are arranged about the hub and subjected to an axial load (referred to as the "preload"). The clamp ring is then put in place and allowed to form its frictional fit before the preload is removed. The clamp ring retains a portion of the preload and thus clamps the spacers and the magnetic discs to the flange located at the second axial end of the hub.

A prior disc spacer for use with a heat shrink clamp is described in the Brooks et al. U.S. Pat. No. 5,006,942. The disc spacer in Brooks et al. is a generally cylindrical ring with an annular groove in its outer cylindrical surface. The annular groove in the disc spacer makes the disc spacer somewhat compliant under the preload. Thus, after the preload is applied, and the thermally responsive clamp is placed on the hub and allowed to form an interference fit with the hub, a portion of the preload applied to the hub assembly is retained due to the compliance of the spacer. Consequently, the thermally responsive clamp secures the magnetic disc to the flange on the hub thereby securing the disc for rotation with the hub.

Two major deficiencies are present in the Brooks et al. design as applied to small disc drives with thin hub flanges and clamps. Application of the load to the outer diameter of the clamp and flange causes deflection of those components distorting the outer discs. Also, when the spacers compress, the contact point is variable depending on part tolerances. This also contributes to disc distortion.

SUMMARY OF THE INVENTION

The present invention arises from the realization that concentrating the load at the outer diameter of the hub flange and clamp causes both to deform under an axial load applied to clamp the discs to the hub. The present invention also arises from the realization that providing the disc spacer with a compliant but flat and extended disc engaging surface makes it difficult to determine where the axial load is actually concentrated along the surface. Thus, manufacturing tolerances and temperature variations in the hub assembly cause variation in the point along the disc spacer at which the concentrated load is applied. This variation leads to inconsistent performance in the hub assembly with respect to disc flatness.

With the present invention, a spacer supports a disc on a hub in a disc drive. The hub is rotatable about an axis of rotation. The spacer includes a member having an inner radial surface defining a hub receiving aperture for receiving an exterior surface of the hub. The inner radial surface has a generally annular groove extending from the inner radial surface generally radially outwardly from the hub.

DETAILED DESCRIPTION OF THE PREFERRED EMBODIMENTS

Figure 1:
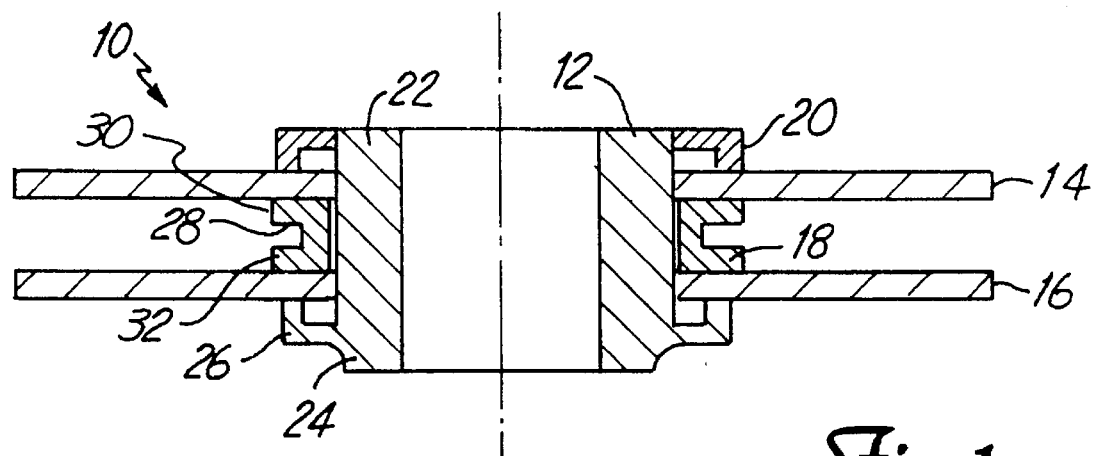
FIG. 1 is a cross-sectional view of a prior art hub assembly.

FIG. 1 is a cross-sectional view of a prior art hub assembly 10. Hub assembly 10 includes a hub 12, a pair of discs 14 and 16, a disc spacer 18 and a thermally responsive clamp 20. Hub 12 has a first axial end 22 and a second axial end 24. A flange 26 is formed generally proximate the second axial end 24 of hub 12. Discs 14 and 16 are concentrically mounted about hub 12, are supported by flange 26, and are spaced by spacer 18.

During assembly, discs 14 and 16, and spacer 18 are placed concentrically about hub 12. An axial force (the preload) is exerted against disc 14, through thermally responsive clamp 20 which then cools and shrinks about hub 12 allowing an interference fit to form with hub 12. Spacer 18 has a generally annular groove 28 formed by radially extending flanges 30 and 32. Groove 28 is provided in an attempt to make spacer 18 somewhat compliant to the preload applied during assembly of hub assembly 10 and act as a spring to retain a portion of the preload after clamp 20 is placed on hub 12.

However, flanges 30 and 32 have disc engaging surfaces which are generally flat along the entire radial distance from hub 12 to the radial outer tips of flanges 30 and 32. This makes the point at which the axial load is actually concentrated vary significantly with manufacturing tolerances and temperature variations in hub 10.

In addition, being loaded at the outer diameter of the hub flange, both clamp 20 and hub flange 26 deflect significantly causing discs 14 and 16 to deform.

Figure 2:
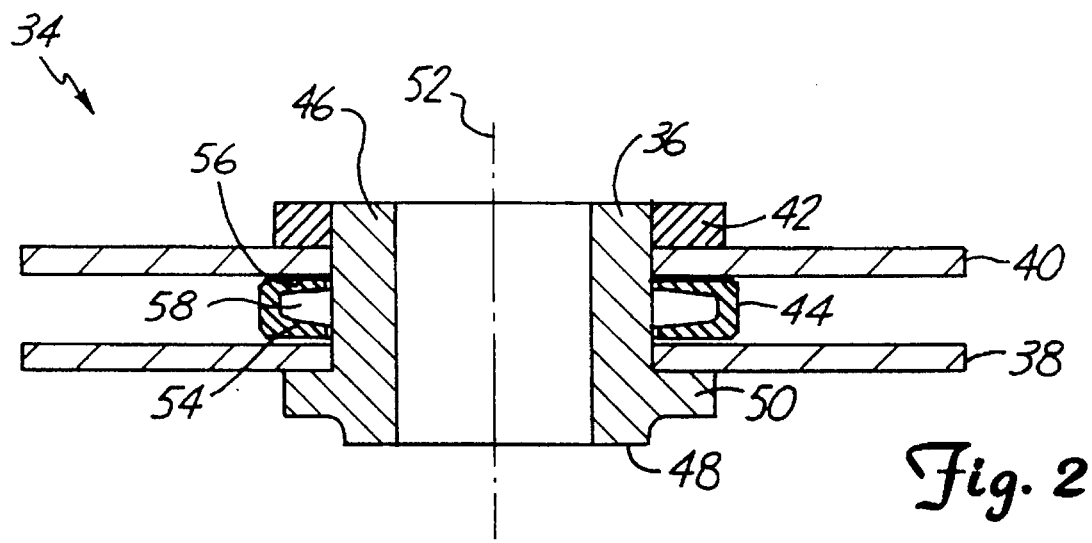
FIG. 2 is a cross-sectional view of a hub assembly according to the present invention.

FIG. 2 is a cross-sectional view of a hub assembly 34 according to the present invention. Hub assembly 34 includes hub 36, discs 38 and 40, thermally responsive clamp 42 and spacer 44. Hub 36 has a first axial end 46 and a second axial end 48. A flange 50, which is preferably integrally formed with hub 36, is disposed generally at the second axial end 48 of hub 36. Discs 38 and 40 are concentrically disposed about hub 36 and are spaced by spacer 44. Clamp 42 and hub 50 exert opposing axial forces on discs 38 and 40 and spacer 44 supporting discs 38 and 40 for rotation with hub 36 about axis of rotation 52.

Spacer 44 has a pair of flanges 54 and 56 which define a generally annular groove 58. Groove 58 communicates with hub 36 and extends generally radially away from hub 36. Flanges 54 and 56 are preferably formed integrally with one another so that spacer 44 is a unitary member.

Since groove 58 communicates at its inner radius with hub 36, spacer 44 is highly compliant at its inner radius (proximate an inner portion of flange 50) to the preload applied during assembly of hub assembly 34. This results in a significant decrease in hub and clamp deformation under the preload over that in prior art hub assembly 10. In addition, since spacer 44 is highly compliant at its inner radius, spacer 44 retains a significantly higher percentage of the preload applied during assembly of hub assembly 34.

For example, the prior art hub assembly 10 shown in FIG. 1, which uses spacer 18, has been observed to retain only approximately 83% of the preload applied during assembly of hub assembly 10. By contrast, assembly 34, using spacer 44, has been observed to retain approximately 90% of the preload applied during assembly of hub assembly 34.

Figure 3:
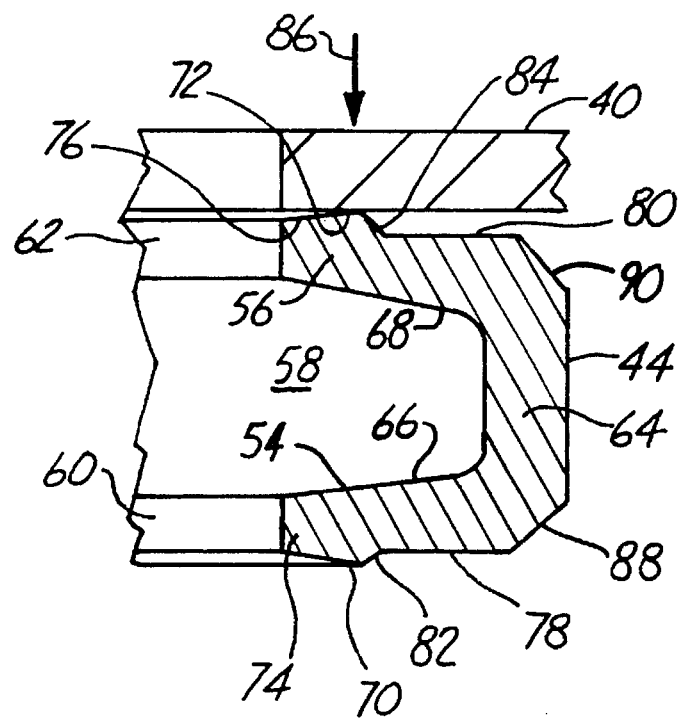
FIG. 3 is a greatly enlarged portion of a disc spacer according to the present invention.

FIG. 3 is a greatly enlarged cross-sectional view of a portion of the spacer 44 shown in FIG. 2. Corresponding items are correspondingly numbered in FIGS. 2 and 3. For the sake of clarity, disc 38 is not shown in FIG. 3. FIG. 3 shows that flanges 54 and 56 have inner radial surfaces 60 and 62, respectively. Flanges 54 and 56 extend from the radial inner surfaces 60 and 62 to a groove terminal portion 64. Flanges 54 and 56 have interior surfaces 66 and 68, respectively, which define groove 58. Interior surfaces 66 and 68 extend from inner radial surfaces 60 and 62 to groove terminal portion 64 in such a way that groove 58 is tapered as it extends radially outward from hub 36. This tapered form increases the compliance of spacer 44 proximate its radial inner surfaces 60 and 62 which leads to an increase in preload retention.

FIG. 3 shows that flanges 54 and 56 have exterior, disc engaging surfaces which are not flat. Rather, the disc engaging surfaces of flanges 54 and 56 have generally single line contact disc supporting regions 70 and 72 which contact discs 38 and 40, respectively. In addition, the disc supporting surfaces of flanges 54 and 56 have inner offset portions 74 and 76 which are axially offset from disc supporting regions 70 and 72. Further the disc supporting surfaces of flanges 54 and 56 have outer offset portions 78 and 80 which are axially offset from disc supporting regions 70 and 72. In the preferred embodiment, inner offset portions 74 and 76 are formed by axially expanding surfaces which extend from inner radial surfaces 60 and 62 to the disc supporting regions 70 and 72 of spacer 44. Also, in the preferred embodiment, outer offset portions 78 and 80 are formed by steps 82 and 84 which extend from disc supporting regions 70 and 72 to outer offset portions 78 and 80.

Figure 4:
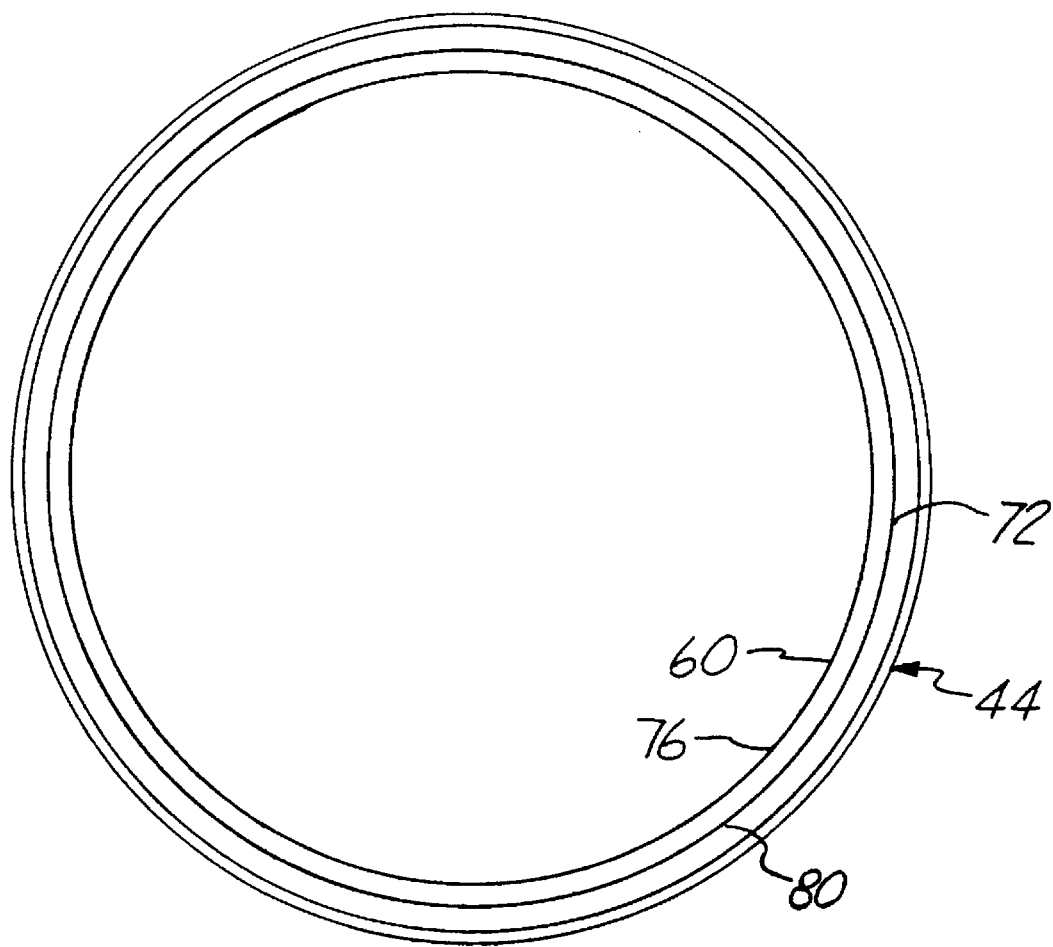
FIG. 4 is a top view of a disc spacer according to the present invention.

The result of such a formation can best be seen in FIG. 4 which is a top view of spacer 44. Rather than having a wide, flat disc contacting area, disc contacting region 72 of spacer 44 is a relatively narrow circular portion. This provides a high degree of predictability in determining where the axial load (indicated by arrow 86 in FIG. 3) will be concentrated on disc 40 in hub assembly 34. This leads to a concentrated load which is consistently located proximate inner radial surface 60, but slightly spaced from inner radial surface 60. Specifically locating the axial load at disc engaging portion 72 leads to a significant reduction in variation of the point at which the axial load is concentrated which can be caused by manufacturing tolerances and temperature variations in hub assembly 34. This provides a higher degree of consistency in drive performance when utilizing hub assembly 34.

It should also be noted that during manufacturing, a disc such as disc 40, may typically contain a number of non-uniformities at its inner diameter. Thus, contacting portion 72 is preferably slightly spaced from the inner radial surface 60 of spacer 44 to avoid contact with any non-uniformities.

Referring again to FIG. 3, the disc supporting surfaces of flanges 54 and 56 preferably have chamfered corners 88 and 90, respectively. By providing chamfered corners 88 and 90, the compliance of spacer 44 under the preload axial force is further increased. It should also be noted that, while corners 88 and 90 are shown as chamfered, they could be formed as 90° corners, resulting in decreased compliance, or they could be trimmed in any other desired shape to increase compliance under the preload force.

Figure 5:
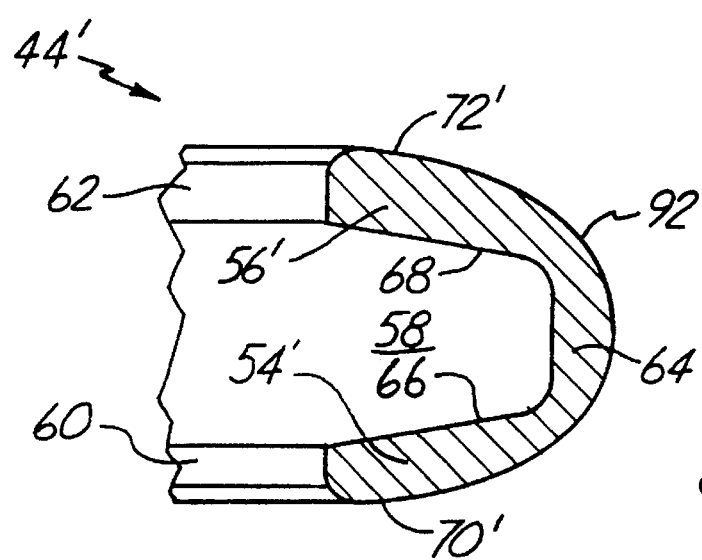
FIG. 5 is an enlarged cross-sectional view of a portion of a second embodiment of a disc spacer according to the present invention.

FIG. 5 shows a greatly enlarged portion of a second embodiment of a spacer 44' according to the present invention. In many aspects, spacer 44' is similar to spacer 44 shown in FIGS. 2, 3 and 4, and similar features are similarly numbered. Spacer 44' has a pair of flanges 54' and 56' which form generally annular groove 58 which communicates with hub 36. However, in the embodiment shown in FIG. 5, flanges 54' and 56' are joined by a curved, or arched, exterior surface 92. Arched exterior surface 92 radially expands from inner radial surfaces 60 and 62 to disc engaging regions 70' and 72' Arched exterior surface 92 then axially narrows from disc supporting regions 70' and 72' to groove terminal portion 64. This configuration, as with that shown in FIG. 4, provides a substantially narrow, circular, disc engaging portion which specifically locates the axial load on spacer 44'.

Thus, spacer 44' is highly compliant at its inner diameter to retain a high percentage of the preload and to reduce hub deformation. Spacer 44' also specifically locates the axial load on spacer 44' thus reducing variation due to manufacturing tolerances and temperature variation in hub assembly 34.

Further, it has been found that the spacer according to the present invention significantly reduces coning of discs 38 and 40 in hub assembly 34. A reduction of approximately 35% has been observed over prior art hub assemblies.

In the preferred embodiment, spacers 44 and 44' are formed of a material which has sufficient resilience to maintain a significant portion of the preload. One preferred material is aluminum; however, steel can also be used although it exhibits less resilience than aluminum. In addition, in one preferred embodiment, the overall axial thickness of spacers 44 and 44' is approximately 0.0663 inches. The overall axial dimension between second offset portions 78 and 80 is approximately 0.060 inches. The overall axial dimension between first offset portions 74 and 76 at the inner radial surfaces 60 and 62 is preferably approximately 0.0653 inches. Finally, in the preferred embodiment, the axial dimension of groove 58 proximate terminal portion 64 is approximately 0.03 inches.

Although the present invention has been described with reference to preferred embodiments, workers skilled in the art will recognize that changes may be made in form and detail without departing from the spirit and scope of the invention.

What is claimed is:

1. A spacer for supporting a disc on a hub in a disc drive, the hub being rotatable about an axis of rotation, the spacer comprising:

a member having an inner radial surface defining a hub receiving aperture for receiving an outer surface of the hub, the inner radial surface having a generally annular groove extending from the inner radial surface generally radially outwardly;

wherein the member includes first and second groove-defining flanges that extend between the inner radial surface and a groove terminal portion radially displaced from the inner radial surface;

wherein the groove has a first dimension measured axially and proximate the inner radial surface and a second dimension measured axially and radially displaced from the inner radial surface, and wherein the first dimension is greater than the second dimension;

wherein the groove defining flanges taper from the second dimension of the groove radially to the first dimension of the groove; and wherein the member is compliant to retain a substantial portion of an axial load placed thereon.

2. The spacer of claim 1 wherein the first and second groove-defining flanges are disposed relative to one another so the groove is tapered between the first and second dimensions.

3. The spacer of claim 1 wherein the first and second groove-defining flanges are integrally formed with one another.

4. The spacer of claim 1 wherein the first and second groove-defining flanges form an exterior surface for supporting the disc, the exterior surface being contoured to have a support region and a first offset portion axially displaced from the support region.

5. The spacer of claim 4 wherein the exterior surface is stepped to form the support region and the first offset portion.

6. The spacer of claim 4 wherein the exterior surface is arched to form the support region and the first offset portion.

7. The spacer of claim 4 wherein the exterior surface includes a second offset portion and wherein the support region is located radially between the first and second offset portions so the support region is radially spaced from the inner radial surface.

8. The spacer of claim 4 wherein the exterior surface has an outer radial portion and wherein the exterior surface is chamfered proximate the outer radial surface.

9. A hub assembly in a disc drive, the hub assembly comprising:

a hub having a first axial end and a second axial end;

a flange disposed generally at the second axial end of the hub;

a disc generally concentrically disposed about the hub and supported by the flange;

a clamping means, coupled to the hub, for clamping the disc to the hub for rotation with the hub;

a disc support, generally concentrically disposed about the hub, and having a disc engaging surface for supporting the disc, the disc engaging surface having a disc supporting region engaging the disc, an inner offset portion axially offset from the disc supporting region, and a step to an outer offset portion axially offset from the disc supporting region, the disc supporting region being located radially between the inner offset portion and the step and along the disc engaging surface, the step being located between the disc supporting region and the outer offset portion; and wherein the disc support includes a member having first and second groove-defining flanges defining a hub receiving aperture and a groove, the groove communicating with the hub receiving aperture and extending radially away from the hub receiving aperture to a groove terminal portion, the first and second groove defining flanges having as an exterior surface the disc engaging surface.

10. The hub assembly of claim 9 wherein the disc support has an inner radial perimeter comprising the hub receiving aperture and an outer radial perimeter located radially outwardly from the inner radial perimeter and wherein the disc engaging portion of the support surface is nearer the inner radial perimeter than the outer radial perimeter.

11. The hub assembly of claim 9 wherein the groove defined by the first and second groove-defining flanges is a tapered groove which tapers as the tapered groove extends away from the hub receiving aperture.

12. A spacer for supporting a disc on a hub in a disc drive, the hub being rotatable about an axis of rotation, the spacer comprising:

a member having an inner radial surface defining a hub receiving aperture for receiving an outer surface of the hub, the inner radial surface having a generally annular groove extending from the inner radial surface generally radially outwardly;

wherein the member includes first and second groove-defining flanges that extend between the inner radial surface and a groove terminal portion radially displaced from the inner radial surface;

wherein the member has groove defining flanges tapered from the outer axial dimension radially to the inner axial dimension;

wherein the member is compliant to retain a substantial portion of an axial load placed thereon; and wherein the member has an exterior disc engaging surface the exterior disc engaging surface having an inner offset portion, a disc support region, a step, and an outer offset portion progressing radially outwardly from the hub.

* * * * *

UNITED STATES PATENT AND TRADEMARK OFFICE
CERTIFICATE OF CORRECTION

PATENT NO. : 5,600,512
DATED     : February 4, 1997
INVENTOR(S) : Hatem R. Radwan et al.

It is certified that error appears in the above-indentified patent and that said Letters Patent is hereby corrected as shown below:

On the title page:
Under [19] Title and under [75] Inventors:

Delete "Radwam" and insert --Radwan--.

Under [56] References cited:

Delete "4,807,304 and insert --4,607,304--

Signed and Sealed this

Third Day of June, 1997

Attest:

BRUCE LEHMAN

Attesting Officer

Commissioner of Patents and Trademarks